(12) United States Patent
Zhang

(10) Patent No.: US 11,263,602 B2
(45) Date of Patent: Mar. 1, 2022

(54) SYSTEM AND METHODS FOR ONLINE/OFFLINE SYNCHRONIZATION

(71) Applicant: Visa International Service Association, San Francisco, CA (US)

(72) Inventor: Zhiqiang Zhang, San Ramon, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 287 days.

(21) Appl. No.: 16/059,308

(22) Filed: Aug. 9, 2018

(65) Prior Publication Data

US 2018/0349868 A1 Dec. 6, 2018

Related U.S. Application Data

(62) Division of application No. 14/968,770, filed on Dec. 14, 2015, now Pat. No. 10,089,609.

(51) Int. Cl.
*G06Q 20/06* (2012.01)
*H04L 29/08* (2006.01)
(Continued)

(52) U.S. Cl.
CPC ......... *G06Q 20/065* (2013.01); *G06Q 20/105* (2013.01); *G06Q 20/229* (2020.05);
(Continued)

(58) Field of Classification Search
CPC ........... G06Q 20/1085; G06Q 20/3276; G06Q 20/3278; G06Q 20/3572; G06Q 50/01;
(Continued)

(56) References Cited

U.S. PATENT DOCUMENTS 5,966,538 A * 10/1999 Granston ............... G06F 8/443 717/158
7,401,143 B2 * 7/2008 Oulu ..................... G06F 11/30 709/224

(Continued)

FOREIGN PATENT DOCUMENTS

JP 2009-123092 A 6/2009
JP 2013-037677 A 2/2013
(Continued)

OTHER PUBLICATIONS

AU2016371911 , "Second Examination Report", dated Jan. 14, 2019, 4 pages.
(Continued)

*Primary Examiner* — Johann Y Choo
(74) *Attorney, Agent, or Firm* — Kilpatrick Townsend & Stockton LLP

(57) ABSTRACT

Embodiments allocate and synchronize virtual currency balance of a user among multiple user devices. A user profile is maintained at a central server. The user profile stores a total virtual currency balance and a designation of multiple user devices associated with the user. The total virtual currency balance may be divided among and allocated to the multiple user devices, for example, based on usage data associated with each user device. The portion of the total virtual currency balance allocated to each user device may be stored locally at a local wallet of the corresponding user device. The local virtual currency balance on a user device may be used to purchase goods or services, such as playing a game. If the locally stored virtual currency balance of a given user device runs low, the user device may request additional virtual currency from other user devices without contacting the central server.

8 Claims, 5 Drawing Sheets

(51) Int. Cl.
　　*G06Q 30/02* (2012.01)
　　*G06Q 20/10* (2012.01)
　　*G06Q 20/36* (2012.01)
　　*G06Q 20/22* (2012.01)
　　*H04L 67/306* (2022.01)
　　*H04L 67/1095* (2022.01)
　　*H04L 67/125* (2022.01)
　　*H04L 67/131* (2022.01)

(52) U.S. Cl.
　　CPC ..... *G06Q 20/3676* (2013.01); *G06Q 30/0226* (2013.01); *H04L 67/1095* (2013.01); *H04L 67/125* (2013.01); *H04L 67/306* (2013.01); *H04L 67/38* (2013.01)

(58) Field of Classification Search
　　CPC .. G06Q 20/085; G06Q 20/145; G06Q 20/065; G06Q 20/3676; G06Q 20/10; G06Q 30/0226; G06Q 20/0229; G06Q 20/105; G06Q 20/36; H04L 67/1095; H04L 67/125; H04L 67/38; H04L 67/306; H04L 37/306
　　See application file for complete search history.

(56) References Cited

U.S. PATENT DOCUMENTS

| | | | | |
|---|---|---|---|---|
| 7,542,921 | B1* | 6/2009 | Hildreth | G06Q 30/0601 705/26.1 |
| 8,485,905 | B2 | 7/2013 | Bortnik et al. | |
| 8,924,387 | B2 | 12/2014 | Grube et al. | |
| 2002/0099776 | A1* | 7/2002 | Cafarella | H04L 65/1096 709/206 |
| 2006/0287004 | A1* | 12/2006 | Fuqua | G06Q 20/0658 455/558 |
| 2008/0006685 | A1 | 1/2008 | Rackley, III et al. | |
| 2010/0158479 | A1* | 6/2010 | Craner | H04N 5/775 386/241 |
| 2010/0250370 | A1* | 9/2010 | Jones | G06Q 30/0269 705/14.66 |
| 2012/0011062 | A1 | 1/2012 | Baker et al. | |
| 2013/0036294 | A1* | 2/2013 | Steiss | G06F 9/322 712/205 |
| 2013/0124331 | A1 | 5/2013 | Doughty et al. | |
| 2013/0144789 | A1* | 6/2013 | Aaltonen | G06Q 40/00 705/44 |
| 2013/0151360 | A1* | 6/2013 | Scipioni | G06Q 20/3672 705/21 |
| 2014/0046788 | A1* | 2/2014 | Lee | G06Q 20/363 705/21 |
| 2014/0080560 | A1 | 3/2014 | Knutsson | |
| 2014/0232518 | A1* | 8/2014 | Stoehr | G07B 15/04 340/5.6 |
| 2014/0287818 | A1 | 9/2014 | Chan et al. | |
| 2014/0324680 | A1 | 10/2014 | Sanford et al. | |
| 2016/0180332 | A1* | 6/2016 | Wilczynski | G06Q 20/36 705/41 |
| 2017/0124541 | A1* | 5/2017 | Aggarwal | G06Q 20/085 |
| 2017/0169403 | A1* | 6/2017 | Zhang | H04L 67/306 |

FOREIGN PATENT DOCUMENTS

| | | |
|---|---|---|
| KR | 10-2014-0039908 A | 4/2014 |
| RU | 2467501 | 11/2012 |
| RU | 125745 | 3/2013 |

OTHER PUBLICATIONS

EP16876542.8, "Extended European Search Report", dated Nov. 21, 2018, 9 pages.
RU2018121504, "Office Action", dated Dec. 19, 2018, 12 pages.
AU2016371911, "Re-Examination Report", dated Feb. 10, 2020, 3 pages.
EP16876542.8, "Office Action", dated Mar. 5, 2020, 7 pages.
International Search Report and Written Opinion, dated Mar. 28, 2017, in PCT Application No. PCT/US2016/066558, 15 pages.

* cited by examiner

SYSTEM AND METHODS FOR ONLINE/OFFLINE SYNCHRONIZATION

CROSS REFERENCE TO RELATED APPLICATIONS

This application is a divisional of U.S. patent application Ser. No. 14/968,770, filed on Dec. 14, 2015, which is herein incorporated by reference in its entirety.

BACKGROUND

Virtual currency is a digital representation of value that is used to acquire goods or services on digital platforms. Often, the virtual currency is used by digital merchants as a strategy to optimize user acquisition, user conversion and user retention. For example, just like air miles for a mileage program can be used to attract and retain a customer or discount coupons can be used to acquire a new user, the free and/or paid virtual currency points can be used to entice users to play games. In some cases, users may interact with the merchant via a user device including a local wallet that stores a virtual currency balance of the user. As users increasingly use devices (e.g. as mobile phones, desktop computers, laptop computers, tablets, etc.) to engage with the merchant, the synchronization of the local wallet balance and activities across these devices becomes a challenge.

There are a number of problems relating to the use of devices associated with a same user account. For example, a user plays a game online on a desktop or a network-connected console at home, and the user has 1000 points in a user account to play the game. The user then goes offline and continues to play the game with the available balance on a mobile phone of the user. All the 1000 points balance was used up on the mobile phone. But since the usage was in offline mode, the balance and activities are not synchronized with the backend server providing the service (e.g. the game) and storing the user account with 1000 points. The user then comes back online, without synchronizing the activities on the user devices (e.g. the desktop or the network-connected console, and the mobile phone), starts to play the game online again, e.g. when the user device is connected to the backend server via a network connection. The backend server, without realizing the additional offline activities, mistakenly allows the user to continue to use the 1000 points balance originally recorded before the user went offline. Accordingly, the backend server unintentionally allows the same 1000 points balance to be used multiple times across multiple devices causing an overdraft problem and resulting in revenue loss for the service provider (e.g. the backend server).

Embodiments of the present invention solve these problems and other problems, individually and collectively.

BRIEF SUMMARY

Embodiments of the present invention enable the synchronization of a user's wallet balance and activities across multiple user devices, either online or offline, to achieve a smooth user experience, and reduce the risk of unwanted fraud and revenue loss.

A central wallet system may divide the available total virtual currency (e.g. points, credits, gaming data) balance among multiple user devices based on, for example, a user profile, a device usage profile, and/or a number of installed applications on user devices. For example, if the game usage statistics suggests that on average 30% of balance is consumed by mobile phone, 30% by desktop, and 40% by gaming console, then 30% of the total virtual currency balance is allocated to the mobile phone when it goes offline, 30% of the total virtual currency balance is allocated to the desktop, and 40% of the total virtual currency is allocated to the game console. The allocation can be dynamically adjusted in time according to the user's personal usage data.

When the balance of a first user device is low or depleted, the local wallet of the first user device can connect to the central wallet to acquire additional virtual currency. Alternatively, the first user device can communicate with a second user device (without any of the user devices being online, e.g. communicating with the central server), and request the second user device to release a portion of its locally-stored balance to the first user device. When multiple user devices are on the same private network (e.g. a home network), the wallet discovery process may be triggered automatically. For example, each local wallet may be capable of advertising its service (e.g. its local virtual currency balance) to the other local wallets on the same network.

Embodiments provide a method including determining, by a central server, a total virtual currency balance associated with a user profile. The user profile is associated with a first user device and a second user device. The method also includes allocating and communicating a first portion of the total virtual currency balance to the first user device. The method further includes allocating and communicating a second portion of the total virtual currency balance to the second user device. The first portion of the total virtual currency balance is stored locally on a memory or storage media of the first user device as a first balance and the second portion of the total virtual currency balance is stored locally on a memory or storage media of the second user device as a second balance. The total virtual currency may be one of virtual money, loyalty points, game points and game data.

In some embodiments, the method further includes communicating with the first device to receive a current value of the first balance, and communicating with the second device to receive a current value of the second balance. The method also includes determining a sum of the current value of the first balance and the current value of the second balance, and comparing the sum to the total virtual currency balance associated with the user profile to ensure that the sum is less than or equal to the total virtual currency balance associated with the user profile. The method further includes transmitting a message to the first user device or the second user device to acquire additional virtual currency when the sum is below a predetermined threshold.

In some embodiments, the user profile may include a first pre-determined usage data assigned to the first user device and a second pre-determined usage data assigned to the second user device. The pre-determined first usage data indicates a usage frequency for the first user device and the pre-determined second usage data indicates a usage frequency for the second user device. The first portion of the total virtual currency balance may be allocated to the first user device based on the first pre-determined usage data assigned to the first user device, and the second portion of the total virtual currency balance may be allocated to the second user device based on the second pre-determined usage data assigned to the second user device.

According to some embodiments, the central server may monitor usage of the first user device to determine actual usage data associated with the first user device, and dynamically adjust a value of the first portion of the total virtual currency balance allocated to the first user device based on the determined actual usage data associated with the first user device.

At least a portion of the first balance is used to acquire a service or an item provided by one or more servers accessible via the first user device. In some embodiments, the first user device communicates with the second user device to receive a portion of the second balance stored on the memory or storage media of the second device when the first user device is offline with respect to the central server. The portion of the second balance is subtracted from the second balance and added to the first balance.

Embodiments may also provide a system including a processor and a computer readable medium coupled to the processor. The computer readable medium comprises code, executable by the processor, to implement the above-described method.

Embodiments further provide a method including receiving, by a first user device, an allocation of a first portion of total virtual currency balance associated with a user profile from a central server. The first user device is associated with the user profile. The method includes storing, by the first user device, the first portion of the total virtual currency balance locally on a memory or storage media of the first user device as a first balance. The method also includes requesting, by the first user device, additional virtual currency from a second user device. The second user device is associated with the user profile at the central server. The second user device stores a second portion of the total virtual currency balance associated with the user profile as a second balance. The method also includes receiving, by the first user device, the additional virtual currency from the second user device. The additional virtual currency is subtracted from the second balance and added to the first balance when the first user device is offline with respect to the central server. The total virtual currency is one of virtual money, loyalty points, game points and game data.

In some embodiments, the method may also include sending, by the first user device, a current value of the first balance to the central server in response to a request received from the central server. The method may further include receiving a message from the central server to acquire supplemental virtual currency when a sum of the current value of the first balance and a current value of the second balance is below a predetermined threshold.

In some embodiments, the method may also include using, by the first user device, at least a portion of the first balance to acquire a service or an item provided by a server. The first user device provides an interface for a user to access the server using the first user device.

In some embodiments, the user profile includes predetermined usage data assigned to the first user device, the usage data indicating a usage frequency for the first user device. The first portion of the total virtual currency balance is allocated to the first user device based on the usage data assigned to the first user device. In such embodiments, the method may also include sending, by the first user device, actual usage data to the central server. The method may also include receiving, by the first user device, a dynamically adjusted value of the first portion of the total virtual currency balance based on the actual usage data.

These and other embodiments are described in further detail below.

DETAILED DESCRIPTION

Figure 1:
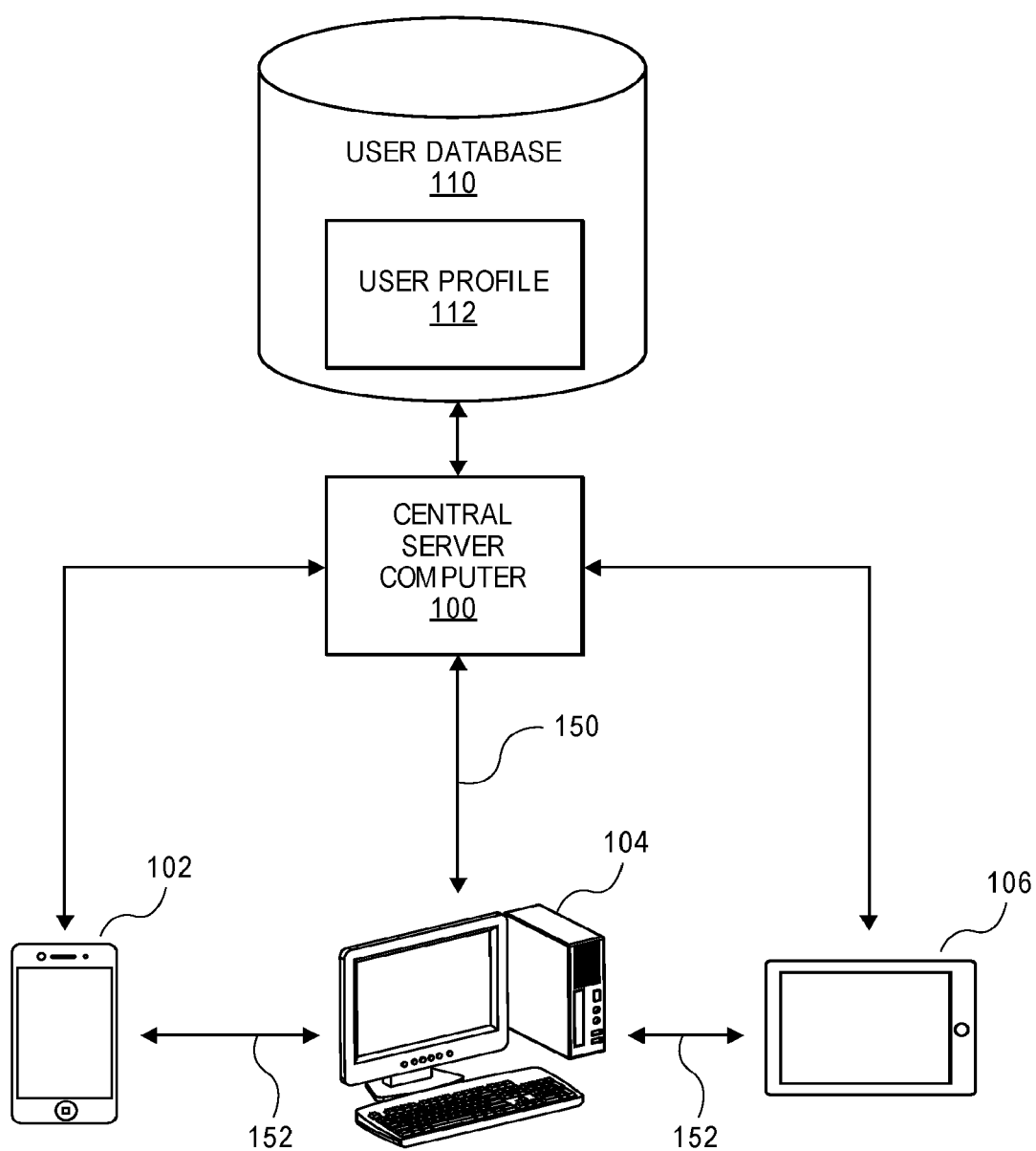
FIG. 1 illustrates a block diagram including multi-channel interaction with a central server in accordance with embodiments of the present application.

Embodiments are directed to methods, apparatuses, computer readable media and systems for allocating and synchronizing virtual currency balance of a user among multiple user devices. Embodiments maintain a user profile (e.g. a user account) of the user at a central server. The user profile stores a total virtual currency balance associated with an account of the user and a designation of multiple user devices associated with the user. For example, the user profile may store identification (ID) information for each one of the user devices. The total virtual currency balance of the user may be divided among and allocated to the multiple user devices. In some embodiments, the allocation may be based on usage data associated with each user device. The portion of the total virtual currency balance allocated to each user device may be stored locally at a local wallet of the corresponding user device. The local virtual currency balance on a user device may be used to purchase items (goods) or services, such as playing a game that requires users to spend virtual currency in order to play the game or advance in the game. If the locally stored virtual currency balance of a given user device runs low, the user device may request additional virtual currency from other user devices without contacting the central server. The local wallets stored on the user devices synchronize with the central server when the user devices are connected to the central server.

According to various embodiments, each user device may store a local wallet component as an application residing on the user device. The central server may store a central wallet component, for example as part of the user profile, where the total virtual currency balance and activities of the user are stored and/or tracked. In some embodiments, the central wallet component may be stored in a central cloud system.

When an application is installed on a user device, the user may be asked to sign into the application or the service (e.g. game). Upon signing in, the central server may divide the available virtual currency balance among the user devices associated with the user account (e.g. registered with the central server) and allocate a portion of the available virtual currency balance to each user device. In some embodiments, the allocation may be communicated to the user through a user interface. The central server may assign a unique ID for each local wallet such that each local wallet may link to the central wallet (e.g. the user profile) using the unique local wallet ID. The local wallet ID may include a combination of a device ID (uniquely identifying the user device) and a user ID (uniquely identifying the user and/or the user profile).

In some embodiments, the central server may distribute the available balance (e.g. the total virtual currency balance) based on the device usage statistics, e.g. how much time the user spent on a given user device (e.g. mobile phone) compared to other user device(s) (e.g. a home game console or a desktop). For example, if it is determined that the usage statistics suggests 30% of the balance is consumed by a first user device, 30% of the balance by a second user device, and 40% of the balance by a third user device, then the central server allocates 30% of balance to first user device when the first device (or any other device operated by the user) goes offline, 30% of balance to the second user device, and 40% of the balance to the third user device. The usage statistics may be dynamically calculated from actual usage data, or be determined based on a prediction model. Even when the initial allocations are made based on pre-determined or predicted usage statistics, the allocation can be dynamically adjusted in time according to actual usage data. Accordingly, the allocation may be increasingly optimized to fit the user behavior without compromising the user experience.

Before discussing specific embodiments and examples, some descriptions of terms used herein are provided below.

As used herein, a "user device" may comprise any suitable electronic device that may be transported and/or operated by a user, which may also provide remote communication capabilities to a network. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of user devices include mobile phones (e.g. cellular phones), PDAs, tablet computers, net books, laptop computers, personal music players, hand-held specialized readers, game consoles, etc. Further examples of user devices may also include wearable devices, such as smart watches, fitness bands, ankle bracelets, rings, earrings, etc., as well as automobiles with remote communication capabilities. A user device may comprise any suitable hardware and software for performing such functions, and may also include multiple devices or components (e.g. when a device has remote access to a network by tethering to another device—i.e. using the other device as a modem—both devices taken together may be considered a single mobile device). In some embodiments, the user device may provide a user interface (e.g. an application or a browser) to play an electronic game or to access external resources such as external servers. In some embodiments, the user device may be used to acquire a service or an item provided by the external servers.

A "central server" or a "server computer" may typically be a powerful computer or cluster of computers. For example, the server computer can be a large mainframe, a minicomputer cluster, or a group of servers functioning as a unit. The server computer may be associated with an entity such as a gaming platform, a merchant, a database (e.g. an information database, an application database, an entertainment database) or an entertainment platform.

A "user" may include an individual or an entity that uses a system. A user may be associated with one or more accounts and/or user devices. In some cases, the user may also be referred to as an account holder, or consumer.

A "user profile" may include information associated with a user. In some embodiments, the user profile may be stored at a server computer, such as the central server. The user profile may include user data such as user identifying data (e.g. user name, address, age group, social status, interests, etc.), user payment data (e.g. a payment account identifier of the user), virtual currency balance, one or more user device information, usage data (e.g. the amount of time that the user spends (i.e. usage frequency) on each user device associated with the user profile).

"Virtual currency" may include digital money or other digital medium of exchange such as loyalty points, game points and game data. The virtual currency may be used to acquire a service or an item provided by a server computer (e.g. a gaming platform, a merchant server computer, etc.)

A "wallet" may refer to a digital wallet or an e-wallet which is a software application that allows an individual to conduct electronic commerce transactions. A digital wallet may store payment credentials, bank account information, one or more digital wallet identifiers and/or the like and can be used in a variety of transactions, such as but not limited to eCommerce, social networks, money transfer/personal payments, mobile commerce, proximity payments, gaming, and/or the like for retail purchases, digital goods purchases, utility payments, purchasing games or gaming credits from gaming websites, playing games, transferring funds between users, and/or the like. A digital wallet may be designed to streamline the purchase and payment process. A digital wallet may also store transaction records (e.g., electronic receipts). In some embodiments, the wallet may store virtual currency balance. The wallet may be stored locally at a user device (e.g. a local wallet) or centrally at a central server (e.g. a central wallet). The local wallet may be associated with a local wallet ID uniquely identifying the local wallet. In some embodiments, the local wallet ID may be formed based on a device ID uniquely identifying the device storing the local wallet, and a user ID uniquely identifying the owner of the user device.

Embodiments enable allocation of a user's wallet balance (e.g. virtual currency balance) to multiple user devices and synchronization of the user's wallet balance and activities across multiple user devices. FIG. 1 illustrates a block diagram including omni-channel interaction with a central server computer 100. Specifically, a first user device 102 (e.g. a mobile communication device), a second user device 104 (e.g. a desktop computer) and a third user device 106 (e.g. a tablet computing device) may interact with the central server computer 100. The user devices 102, 104, 106 may belong to the same user or to family and friends of the user.

In some embodiments, the user may create a user profile 112 with the central server computer 100. The central server computer 100 may store the user profile 112 at a user database 110. The user database 110 may be stored at the central server computer 100 or may be remotely accessible to the central server computer 100. The user profile 112 may include user data such as user identification data (e.g. user name, social media nickname(s), email address, telephone number, billing address, etc.), user payment data (e.g. payment account number, expiration date, security code, etc.), virtual currency balance of the user, information associated with user devices 102, 104, 106 (e.g. a mobile communication device, a tablet, a desktop computer, a gaming console, etc.), usage data (e.g. usage statistics) associated with each user device, a number of applications installed and/or provisioned on each user device, etc. In some embodiments, the same user profile may be associated with a desktop computer of a parent, a mobile communication device of the parent and a laptop computer of the parent's child.

Each user device 102, 104, 106 may be identified in the user profile by a unique device ID. Each user device may be associated with usage data. In some embodiments, the usage data may be a pre-determined value assigned to the user device. In other embodiments, the usage data may be dynamically determined by monitoring usage of each user device. In yet other embodiments, a preliminary pre-determined usage data value may be assigned to each user device. The usage data may then be dynamically determined to account for actual usage of the user devices. For example, initially, the virtual currency balance of the user may be equally divided among the registered user devices (e.g. the user devices that are associated with the user profile). The central server computer 100 may keep track of how often the user needs to replenish the balance on each user device. Based on actual usage monitoring, the central server computer 100 may update the usage data associated with each user device. For example, if the central server computer 100 determines that the user uses the mobile device 70% of the time (or that the local virtual currency balance assigned to the mobile device depletes 70% times faster than other user devices), the central server computer 100 assign 70% of the total virtual currency balance of the user to the mobile device. In some embodiments, the usage data may be determined based on a number of applications installed on a user device. For example, if a first user device has 10 applications installed thereon and a second user device has 100 applications installed thereon, it may be determined that the second user device is used more often and, hence, should get a larger allocation of total virtual currency balance.

Upon receiving the allocated portion of the total virtual currency balance from the central server computer 100, each user device 102, 104, 106 may locally store the allocated portion of the total balance as a local virtual currency balance. For example, the local virtual currency balance may be stored at a local wallet of the user device. The local virtual currency balance may be used for activities performed on the user device (e.g. to purchase goods or services, play games on the user device, etc.) or may be shared with other registered user devices associated with the user profile. For example, when the local virtual currency balance of the user device 102 depletes, the user device 102 may contact the user device 104 and/or user device 106 (e.g., either through a direct connection or through an intermediate server computer) to request additional virtual currency. Such balance transfer may be performed when the user device 102 is not connected to the central server computer 100 (e.g. cannot communicate with the central server computer 100) or when the user does not wish to acquire additional virtual currency prior to depleting all the available balance associated with other user devices.

When each user device 102, 104, 106 is subsequently connected to the central server computer 100, the central server computer 100 may synchronize the user profile with the virtual currency balance and other activities performed on each user device 102, 104, 106. In some embodiments, the central server computer 100 may ensure that the sum of the current value of local virtual currency balance of each user device 102, 104, 106 is less than or equal to the total virtual currency balance previous stored on the central server computer 100.

In an exemplary embodiment, the central server computer 100 may determine that a given user profile may be associated with a total virtual currency balance of 1000 units at time t=0. The central server computer 100 may assign 700 units to user device 102, 200 units to user device 104, and 100 units to user device 106. Each user device 102, 104, 106 may locally store the virtual currency balance assigned to them. The user may start playing a game using the 700 units on the user device 102. The user device 102 may no longer be in communication with the central server computer 100 while the user is playing the game. The user may use up all of the 700 units allocated to and locally stored at the user device 102. Instead of contacting the central server computer 100 to acquire additional credit, the user may contact the user device 104 via the user device 102 to transfer virtual currency balance to the user device 102. For example, the user may transfer 100 units from the user device 104 to the user device 102. The user may continue playing the game on the user device 102 and use up the additional 100 units as well. The user may then continue playing the game on the user device 104 and use 50 points. The user may also play the game on the user device 106 and use all 100 points allocated to and locally stored by the user device 106. When the user devices 102, 104, 106 connects to the central server computer 100 at time t=$t_1$ (where $t_1$>0), the central server computer 100 may synchronize the data stored at the user profile with data (e.g. virtual currency balance, gaming data, usage statistics, etc.) acquired from the user devices 102, 104, 106. In the example provided above, the central server computer 100 may determine that the user has only 50 units left in their total virtual currency balance. In some embodiments, the central server computer 100 may notify the user of the remaining balance and invite user to acquire (e.g. purchase) additional virtual currency units.

When the user devices 102, 104, 106 are not in communication with the central server computer 100, they may communicate with each other through a local area network, or directly using a wireless protocol such as Bluetooth™ (classic or BLE or Bluetooth™ Low Energy). In addition to transferring virtual currency balances between these devices, it is also possible to transfer data regarding the state of play of a game that resides on all three user devices 102, 104, 106 so that the game can be played and continued on any of the user devices 102, 104, 106 at any suitable time.

In some embodiments, the central server computer 100 may not allow the user to withdraw additional virtual currency units from the total virtual currency balance stored in the user profile unless all registered user devices are connected and synchronized with the central server computer 100. This may prevent overdraft from the total balance. For example, in the embodiment illustrated above, when all user devices are connected to the central server computer 100, the central server computer 100 may determine that the user has now only 50 units left in their central wallet. In some embodiments, the central server computer 100 may retrieve the 50 units from the user device 104 and allow the user to use the 50 units on any of the user devices 102, 104, 106.

In some embodiments, in order to prevent overdraft on the total virtual currency balance, the central server computer 100 may not store the total virtual currency balance on the user profile database 110 once the total balance is divided among and allocated to the registered user devices. The user profile database 110 may store a balance history to illustrate how the previous total balance have been allocated. However, once the allocation is complete, unless a local balance is transferred back from any user device to the central server computer 100 (and thus to the user profile), the central server computer 100 may no longer allow the user devices 102, 104, 106 to withdraw from the central wallet (e.g. the total balance stored in the user profile).

In some embodiments, the user devices 102, 104, 106 may communicate with the central server computer 100 via a first communication channel or communications network 150. The user devices 102, 104, 106 may communicate with each other via a second communication channel or communications network 152. In some embodiments, the multiple user devices may be connected to a same network (e.g. a home network). Suitable communications networks may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. In an exemplary embodiment, the first communication channel or communications network 150 may include the Internet and the second communication channel or communications network 152 include a local communication channel, such as intranet, Bluetooth, personal area network or Short Message Service (SMS).

Figure 2:
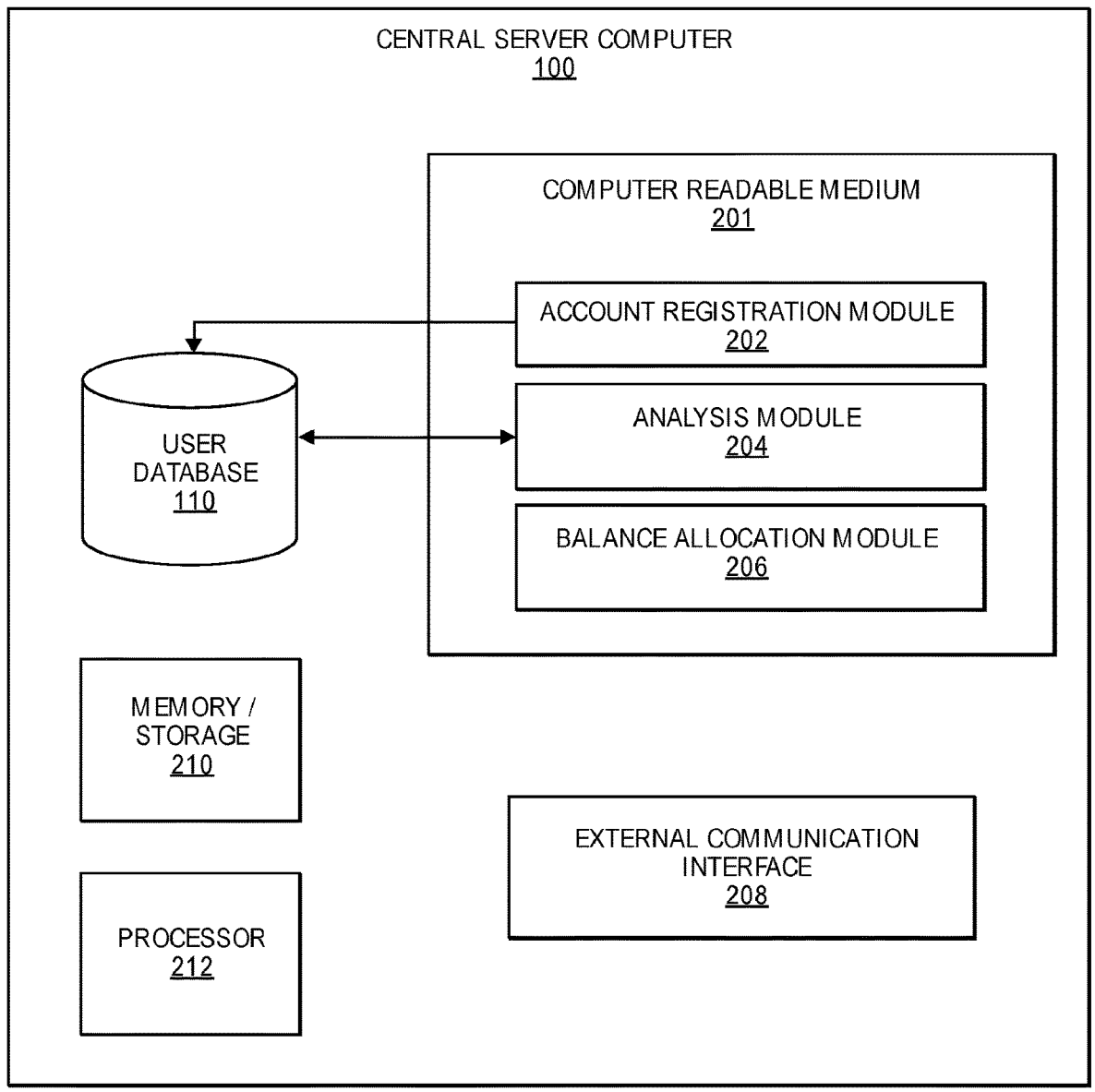
FIG. 2 shows a block diagram of a central server computer in accordance with embodiments of the present application.

FIG. 2 shows a block diagram of a central server computer 100 in accordance with embodiments of the present application. The central server computer 100 comprises a processor 212, a memory or storage 210, an external communication interface 208 (e.g. a network interface), a user database 110, and a computer readable medium 201.

The computer readable medium 201 may comprise an account registration module 202, an analysis module 204, a balance allocation module 206 and any other suitable software module(s). The computer readable medium 201 may also comprise code, executable by the processor 212 for implementing a method comprising determining a total virtual currency balance associated with a user profile, allocating and communicating a first portion of the total virtual currency balance to the first user device, and allocating and communicating a second portion of the total virtual currency balance to the second user device. The user profile may be associated with a first user device and a second user device. The first portion of the total virtual currency balance may be stored locally on a memory or storage of the first user device as a first balance and the second portion of the total virtual currency balance may be stored locally on a memory or storage of the second user device as a second balance.

The account registration module 202 may comprise code that causes the processor 212 to register an account for a user. For example, the account registration module 202 may generate a user account for the user at the user database 110. The user account may include information (e.g. user data) associated with the user. For example, the user account may include user identification data (e.g. user name, social media nickname(s), email address, telephone number, billing address, etc.), user payment data (e.g. payment account number, expiration date, security code, etc.), virtual currency balance of the user, information associated with multiple user devices (e.g. a mobile communication device, a tablet, a desktop computer, a gaming console, etc.), usage data (e.g. usage statistics) associated with each user device, a number of applications installed and/or provisioned on each user device, etc.

The balance allocation module 206 may retrieve the total virtual currency balance of the user from the user database 110 where the user profile associated with the user is stored. The balance allocation module 206 may also retrieve, from the user database 110, information about user devices associated with the user profile. For example, the balance allocation module 206 may retrieve information regarding user devices registered with the user profile and usage data associated with each user device. Upon retrieving the data from the user database 110, the balance allocation module 206 may divide the total virtual currency balance among the multiple user devices. In some embodiments, the balance allocation module 206 may divide the total virtual currency balance among the user devices based on the usage data associated with each device. The balance allocation module 206 may allocate portions of the total virtual currency balance to corresponding user devices.

In some embodiments, the initial allocation of the total virtual currency balance may be based on a pre-determined usage data assigned to each user device. The pre-determined usage data may be indicative of usage frequency (e.g., the total amount of time that a particular user device may be used to play a game) of each user device. The balance allocation module 206 may monitor the usage of the user devices to determine actual usage data associated with the user devices. The balance allocation module 206 may dynamically adjust (e.g. modify) the allocation of the virtual currency balance based on the actual usage data.

The analysis module 204 may prevent overdraft from the total virtual currency balance by analyzing current local virtual currency balance for each user device. The analysis module 204 may receive current values of local balances from the user devices and determine a sum of the current values of the local balances. In some embodiments, the analysis module 204 may receive data from the user devices via the external communication interface 208. The analysis module 204 may then compare the sum to the total virtual currency balance associated with the user profile to ensure that the sum is less than or equal to the total virtual currency balance. In some embodiments, if the analysis module 204 determines that the sum is below a predetermined threshold, the analysis module 204 may generate a message to acquire additional virtual currency. The message may be transmitted to the user devices via the external communication interface 208.

Figure 3:
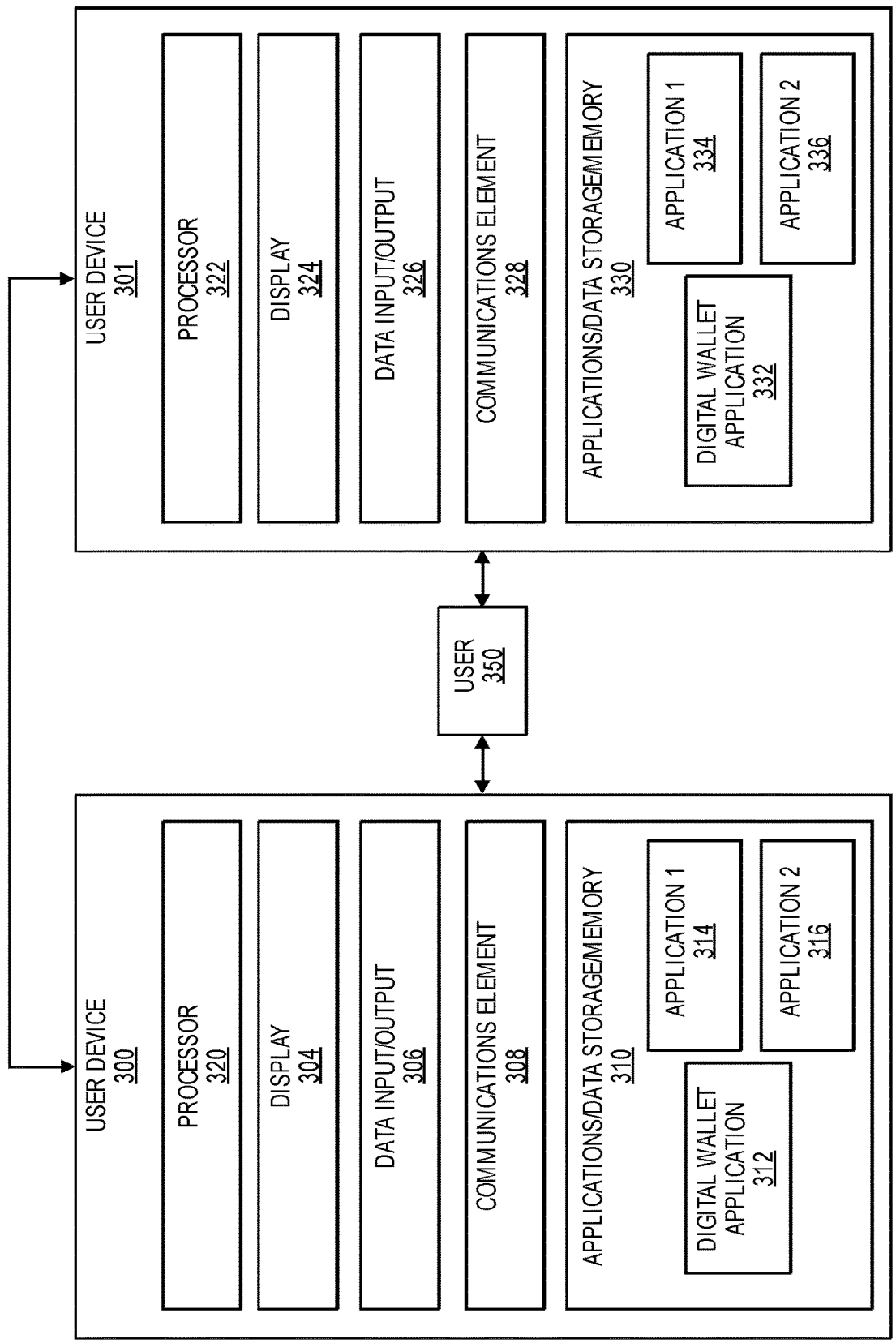
FIG. 3 shows block diagrams of exemplary user devices in accordance with some embodiments of the invention.

Examples of the user devices 300 and 301 that may be operated by the same user 350, according to some embodiments of the invention, are shown in FIG. 3. Each user device 300 or 301 may include circuitry that is used to enable certain device functions, such as communication, computing or gaming. The functional elements responsible for enabling those functions may include a processor 302, 322 that can execute instructions that implement the functions and operations of the device. The processor 302, 332 may access the memory 310, 330 (or another suitable data storage region or element), respectively, to retrieve instructions or data used in executing the instructions, such as mobile applications (e.g. games, merchant applications, or internet browser). Data input/output elements 306, 326, such as a keyboard or touchscreen, may be used to enable a user to operate the user devices 300, 301, respectively, and input data (e.g. to play a game). Data input/output elements 306, 326 may also be configured to output data (via a speaker, for example). Display 304, 306 may also be used to output data to a user. Communications element 308, 310 may be used to enable data transfer among the user devices 300, 301 via the communications channel 152 or enable data transfer between the user devices 300, 301 and a central server (e.g. central server computer 100 illustrated in FIG. 2) via a wired or wireless network to assist in connectivity to the Internet or other network, and enabling data transfer functions. In some embodiments, user devices 300 and 301 may transfer data therebetween via near field communications (NFC) data transfer or another form of short range communications technology.

Referring now to user device 300, the memory 310 may comprise a digital wallet application 312. The user device 300 may have any number of mobile applications installed or stored on the memory 310 and is not limited to that shown in FIG. 3. In some embodiments, the user device 300 and the user device 301 may include at least one common application. For example, as illustrated in FIG. 3, application 314 may be installed both on the user device 300 and user device 301. Each user device may include additional application(s) that may be uniquely installed on the user device. For example, in addition to application 314, application 316 may be installed on the user device 300 and application 334 may be installed on the user device 301.

The memory 310 may also comprise code, executable by the processor 302 for implementing a method comprising receiving an allocation of a first portion of total virtual currency balance associated with a user profile from a central server, storing the first portion of the total virtual currency balance locally on the digital wallet application 312 as a first balance, requesting additional virtual currency from the user device 301, and receiving the additional virtual currency from the user device 301. The user devices 300 and 301 may be associated with the user profile at the central server. The user device 301 may locally store a second portion of the total virtual currency balance associated with the user profile at a digital wallet application 332 as a second balance in the memory 330. The additional virtual currency may subtracted from the second balance and added to the first balance.

The digital wallet applications 312, 332 may be able to communicate with a central wallet, which in some embodiments may be stored at the central server computer 100. The digital wallet applications 312, 332 may be able to store and/or access virtual currency. As provided above, the digital wallet applications 312, 332 may also be able to request additional virtual currency from other user devices. For example, the wallet application 312 may request additional virtual currency from the digital wallet application 332 provided on the user device 301. The digital wallet application 332 provided on the user device 301 may send all or a portion of the virtual currency balance allocated to the user device 301 by the central server computer 100 (e.g. by the balance allocation module 206 of the central server computer 100) and locally stored at the digital wallet application 332.

In some embodiments, the user device 300 or 301 may send a message to the central server when virtual currency has been transferred between the user devices 300 and 301. In some embodiments, such transfer may occur when the user device 300 cannot communicate with the central server computer 100 (e.g. when the user device 300 is offline with respect to the central server computer 100). In such embodiments, if the user device 300 sends a message to the central server computer 100 regarding the balance transfer, the message may be relayed when the user device 300 is online at a later time. In other embodiments, the transfer may occur when the user 350 does not want to acquire new virtual currency prior to using the local balances on other user devices.

Figure 4:
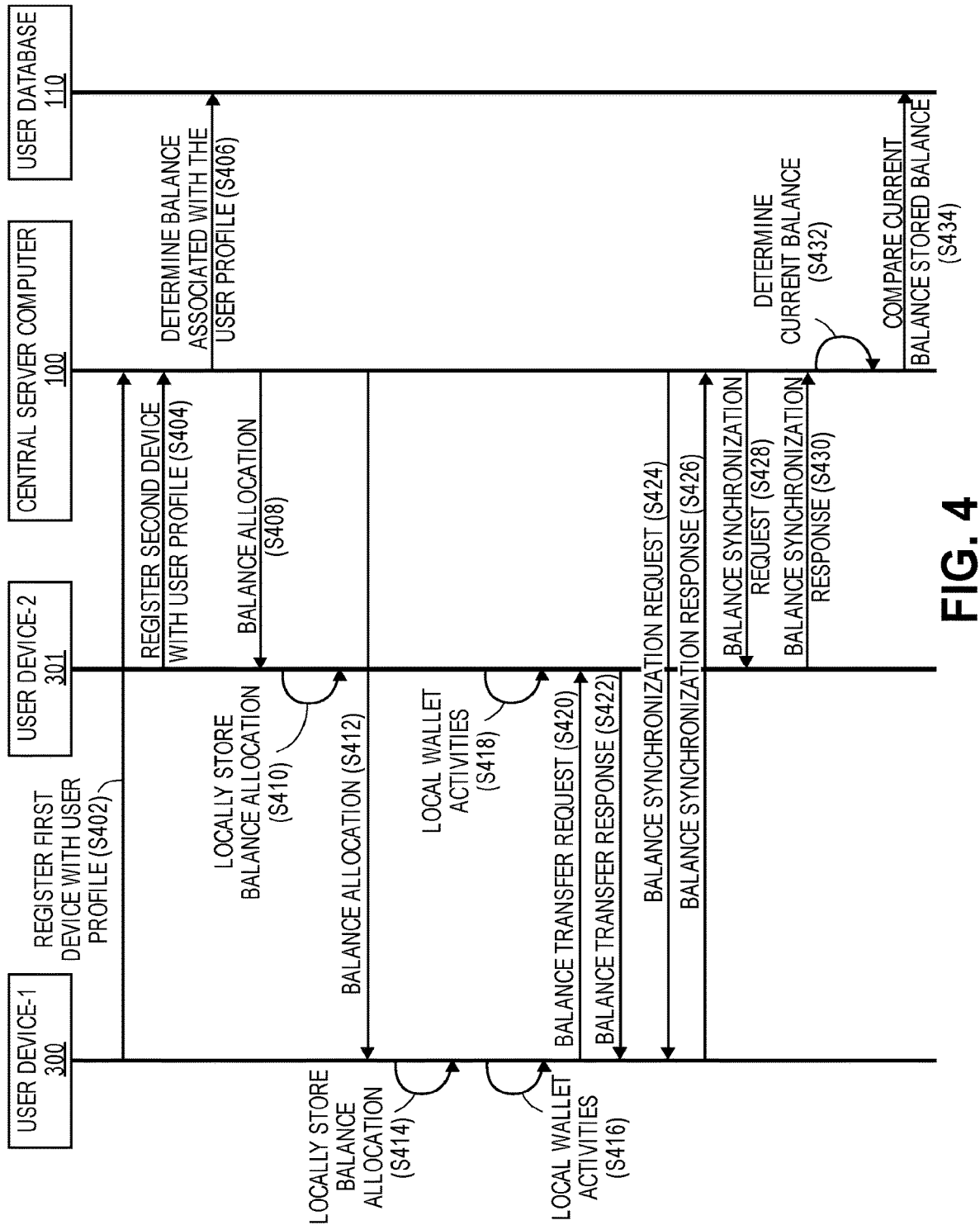
FIG. 4 illustrates a system and a flow diagram for allocating and synchronizing virtual currency balances on multiple user devices in accordance with some embodiments of the invention.

A method for allocating and synchronizing virtual currency balances among multiple user devices and a central server according to embodiments of the invention can be described with respect to FIG. 4. The steps shown in any method herein may be performed sequentially or in any suitable order in embodiments of the invention. In some embodiments, one or more of the steps may be optional. The various messages described below may use any suitable form of communication. In some embodiments, a request or response may be in an electronic message format, such as an e-mail, a short messaging service (SMS) message, a multimedia messaging service (MMS) message, a hypertext transfer protocol (HTTP) request message, a transmission control protocol (TCP) packet, a web form submission. The request or response may be directed to any suitable location, such as an e-mail address, a telephone number, an internet protocol (IP) address, or a uniform resource locator (URL).

In some embodiments, a request or response may comprise a mix of different message types, such as both email and SMS messages.

According to some embodiments, the user may interact with the central server computer 100 to create a user profile. The central server computer 100 may store the user profile at a user database 110. The user profile may include a virtual currency balance associated with an account of the user in addition to other user data such as user identification data, user payment data, etc. At step S402, the central server computer 100 may register the first user device 300 with the user profile. For example, as part of the registration, the central server computer 100 may store a first unique device ID associated with the first user device 300 at the user profile. At step S404, the central server computer 100 may register the second user device 301 with the user profile. For example, the central server computer 100 may store a second unique device ID associated with the second user device 301 at the user profile.

In some embodiments, as described herein, the user devices 300, 301 may communicate with each other to transfer virtual currency, game status, and other information while they are not connected to the central server computer 100. Accordingly, in some instances each user device 300, 301 may be provide with a shared secret which may be shared with the central server computer 100. The shared secret may serve as proof that the user devices 300, 301, and server computer 100 are allowed to share information and dynamically adjust virtual currency balances between each other. In some cases, the shared secret may be an encryption key, which can be used to sign data that is transferred between the user device 300, the user device 301, and the central server computer 100. Such encryption keys may be derived on the devices 300, 301 themselves using data on those devices (e.g., an account number or user login information), may be included in the installation of applications on those devices, or may be delivered to those devices in separate communications.

At step S406, the central server computer 100 may interact with the user database 110 to determine the total virtual balance associated with the user profile. In some embodiments, the central server computer 100 may also retrieve, from the user database 110, pre-determined usage data associated with the first user device 300 and the second user device 301.

The central server computer 100 may divide the total virtual currency balance among the user device 300 and user device 301, and allocate a portion of the total virtual currency balance to each one of the user devices 300 and 301. As illustrated in FIG. 4, the central server computer 100 may allocate a first portion of the total virtual currency balance to the user device 301 at step S408 and a second portion of the total virtual currency balance to the user device 300 at step S412. One of ordinary skill in the art will appreciate that the number of user devices illustrated in FIG. 4 is for illustrative purposes only and that the total virtual currency balance may be distributed among and allocated to any number of user devices that are associated with the user profile at the user database 110. At steps S408 and S412, the central server computer 100 may allocate the total virtual currency balance among all available user devices associated with the user profile. In some embodiments, the user may specific identify one of the registered user devices as being exempt from the virtual currency allocation. For example, the user may register a user device used by his child with the user profile. However, the user may not wish to allocate any virtual currency balance to the user device used by the child.

In some embodiments, the central server computer 100 may allocate the total virtual currency balance among the registered user devices based on the pre-determined usage data associated with each user device. For example, the usage data may indicate that the central server computer 100 should allocate 30% of the total virtual currency balance to the user device 300 and 70% of the virtual currency balance to the user device 301. Alternatively, the control server 100 may determine that the user device 300 (or a specific application running on the user device 300) is active 40% of the time and the user device 301 (or a specific application running on the user device 301) is active 60% of the time, then the central server may allocate 40% of the total virtual currency balance to the user device 300 and 60% of the virtual currency balance to the user device 301. The activity of each device and/or each application running on each device may be determined in any suitable manner. For example, the amount of time that each application is actually open or accessed may indicate the percent activity for that application or device. In another example, the number of user interactions (e.g., the number of times that buttons are actually depressed within a game) can determine the percent activity for that application or device. For example, if a user moves a character on the user device 300 six hundred times within one day and he moves that character four hundred times on the user device 301 within another one day period, then the allocation may be 60% for the user device 300 and 40% for the user device 301.

The control server 100 may also retrieve a number of applications installed on each user device from the user database 110. In some instances, the number of applications installed on a user device may indicate the usage frequency of that user device. Accordingly, the central server computer 100 may allocate the total virtual currency balance based on a number of applications installed on a user device.

Yet in other embodiments, the user may indicate one of the user devices as a gaming device (or any other type of user device) on the user profile and may request that more of the virtual currency balance to be allocated to the gaming device. Similarly, the user may also specify (e.g., through an appropriate user interface) the balance allocation scheme that the user would like to be applied among the registered user devices. Such allocation scheme may be stored at the user profile and used by the central server computer 100 during balance allocation at steps S408 and S412.

At step 410, the user device 301 may locally store the virtual currency balance allocated to the user device 301 by the central server computer 100. For example, the user device 301 may store the allocated virtual currency balance at a local wallet. At step 414, the user device 300 may locally store the virtual currency balance allocated to the user device 300 by the central server computer 100. For example, the user device 300 may store the allocated virtual currency balance at a local wallet.

At step S416, the user may perform activities on the user device 300 that may use at least a portion of the local balance stored on the local wallet of the user device 300. For example, the user may play a game installed on the user device 300 using the local virtual currency balance stored on the local wallet of the user device 300.

At step S418, the user may perform activities on the user device 301 that may use at least a portion of the local balance stored on the local wallet of the user device 301. For example, the user may play the same game which is also installed on the user device 301 using the local virtual currency balance stored on the local wallet of the user device 301. The local virtual currency balance may include virtual money, loyalty points, game points and/or game data. In some embodiments, the user may simultaneously play the game on both user devices 300 and 301. In other embodiments, the user may play the game on the user device 300 and then, subsequently, may continue playing the game on the second user device 301.

When the local balance on the user device 300 runs low or depletes, the user may wish to use the local balance stored on the user device 301. Accordingly, at step S420, the user device 300 may send a balance transfer request to the user device 301. In some embodiments, the user device 300 may not be able to communicate with the central server computer 100 to purchase additional funds. That is, the user device 300 may be offline with respect to the central server 300. However, the user device 300 may still communicate with the user device 301 through, for example, a local area network, Bluetooth or SMS.

At step S422, in response to the balance transfer request, the user device 301 may transfer at least a portion of the local virtual currency balance stored on the local wallet of the user device 301 to the user device 300. The user device 300 may store the received balance at its local wallet. The user may continue playing the game (or performing other activities) on the user device 300 using the received balance now stored at the local wallet of the user device 300.

At step S424, when the communication between the central server computer 100 and the user device 300 is established, the central server computer 100 may send a balance synchronization request to the user device 300. At step S426, in response to the balance synchronization request, the user device 300 may send the current value of the local virtual currency balance to the central server computer 100.

At step S428, when the communication between the central server computer 100 and the user device 301 is established, the central server computer 100 may send a balance synchronization request to the user device 301. At step S430, in response to the balance synchronization request, the user device 301 may send the current value of the local virtual currency balance to the central server computer 100.

At step S432, the central server computer 100 may determine the current virtual currency balance by taking a sum of the current value of the local virtual currency balance of the user device 300 and the current value of the local virtual currency balance of the user device 301. At step S434, the central server computer 100 may compare the current virtual currency balance to the total virtual currency balance stored on the user profile to ensure that the current virtual currency balance is lower than the total virtual currency balance previously stored in the user profile. The central server computer 100 may update the user profile by replacing the previously stored total virtual currency balance with the current total virtual currency balance.

In some embodiments of the invention, once the central server computer 100 has the current virtual currency balance for the user's account, the central server computer 100 may then re-allocate virtual currency balances to each or the devices based upon the new virtual currency balance. This can be done whether or not the user has purchased or earned new virtual currency. This re-allocation of virtual currency amongst different user devices can occur in some cases only after each user device has re-established a connection with the central server computer 100 so that the system as a whole has been synchronized.

In some embodiments, the central server computer 100 may compare the current total virtual currency balance to a pre-determined threshold value, and if the current total virtual currency balance is lower than the pre-determined threshold, the central sever 100 may send a message to the user (e.g. to the user device 300 and/or user device 301) to invite the user to acquire additional virtual currency.

The virtual currency may be acquired by purchasing, earning points or acquiring free points. For example, the user may spend money to acquire paid points, may earn points in response to user activities or may acquire free points that may be awarded to user, for example, to attract the user to use the service (e.g. play the game). In some embodiments, overdraft of paid points may not be allowed. Alternatively, a pre-determined amount of the available paid point balance may be available for overdraft. A more generous policy may apply to free points, e.g. a bigger percentage of the available free point balance may be used in the offline mode for overdraft.

With the allocated balance and overdraft protection, the user plays the game on the go in the offline mode, just like the online mode. When the local balance is used up in the offline mode, a prompt may come up for the user to synchronize the activities with either the central server or other user devices, and obtain more balance. The synchronization may be carried out between the local wallet and the central wallet with the wired/wireless data connection or any other data connection that connects the user device to the central wallet system. Alternatively, the synchronization may be carried out between two or more user devices using a device-to-device connection. In an exemplary device-to-device connection, a mobile phone can connect the local wallet to another wallet on a tablet, a desktop, or a game console through, for example, short-range Bluetooth or Wi-Fi connection, or other data exchange channels such as via SMS.

In the device-to-device synchronization, one local wallet may ask another local wallet to release at least a portion of its balance and activities. Since the multiple user devices will be associated with the same user profile owned and used by a person, a family, or some very close friends, such requests may be granted permission quickly and reliably. For additional security, the request and response may include the location of the user devices obtained directly from each user device.

In some embodiments, when multiple devices are on the same private network (e.g. a home network), the wallet discovery process may be triggered automatically to facilitate the wallet synchronization process. Each local wallet may be capable of advertising its service (e.g. local balance of virtual currency) to the other local wallets on the same network, and responding to the requests from the other local wallets. Once the service is discovered, the local wallet can still ask for explicit permission from the user before cooperating on the further wallet synchronization requests, or can decide to skip this step since devices on private network can be assumed trusted.

In device-to-central server synchronization process, the connection between the local wallet stored on the user device and the central wallet stored on the central server may be intermittent. Accordingly, the wallet synchronization request and response may be carried out in a batch mode, with each local wallet caching its activities (e.g. caching a timestamp, an activity type such as grant points or deduct points, and ID of the purchased product). Such activities are then be transferred from the user device to the central server when the user device is connected to the central server. Each transferred activity may be prepended with its unique wallet ID (e.g. generated using the device ID and the user ID) to make sure that the wallet activities can be uniquely traced back to its origin (i.e. the user device storing the wallet).

Embodiments of the invention have a number of advantages. For example, in embodiments of the invention, overdraft from the total virtual currency balance of the user is prevented. Synchronization of user's wallet balance and activities across multiple devices, both online or offline, achieves smooth user experience and reduces the risk of unwanted fraud and revenue loss due to overdraft. Accordingly, embodiments improve fraud prevention techniques and systems through overdraft prevention.

Figure 5:
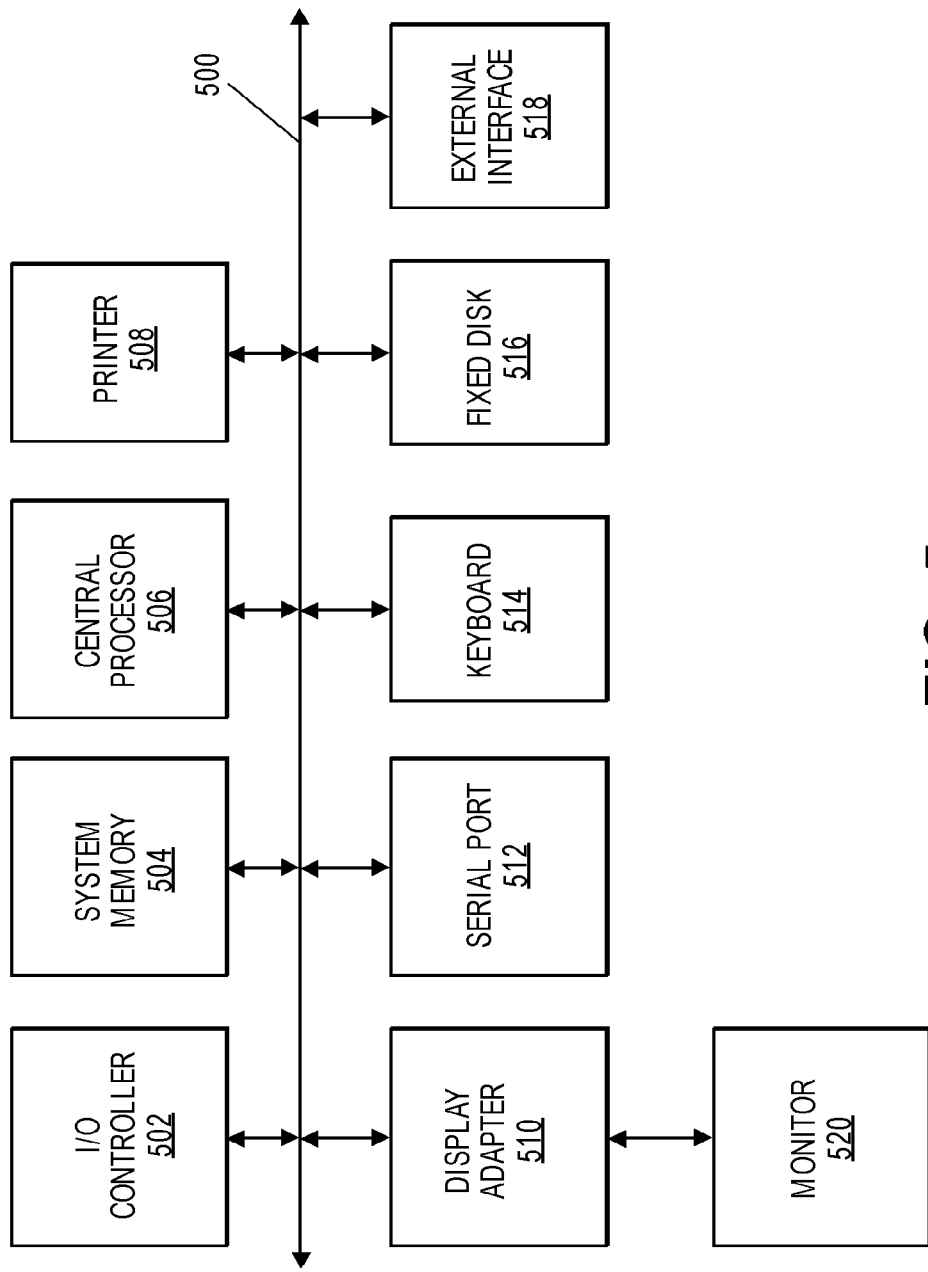
FIG. 5 shows an exemplary computer system according to embodiments of the present invention.

The various participants and elements shown in FIGS. 1-4 may operate one or more computer apparatuses (e.g., a server computer) to facilitate the functions described herein. Any of the elements in FIGS. 1-4 may use any suitable number of subsystems to facilitate the functions described herein. Examples of such subsystems or components are shown in FIG. 5. The subsystems such as a printer 508, keyboard 514, fixed disk 516 (or other memory comprising computer readable media), monitor 520, which is coupled to a display adapter 510, and others are shown. Peripherals and input/output (I/O) devices, which couple to I/O controller 502, can be connected to the computer system by any number of means known in the art, such as serial port 512. For example, serial port 512 or external interface 518 can be used to connect the computer apparatus to a wide area processing server computer, such as the Internet, a mouse input device, or a scanner. The interconnection via system bus 500 allows the central processor 506 to communicate with each subsystem and to control the execution of instructions from system memory 504 or the fixed disk 516, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, Java, Objective C, C/C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or processing server computer.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
   receiving, by a first user device, an allocation of a first portion of total virtual currency balance associated with a user profile from a central server based on a first allocation scheme, wherein the first user device is associated with the user profile of a user;
   storing, by the first user device, the first portion of the total virtual currency balance locally on a digital wallet of the first user device as a first balance;
   storing, by the first user device, a first application among a first set of applications on a memory of the first user device, wherein the first application is activated on the first user device using virtual currency balance locally stored on the first user device;
   receiving, by a second user device, an allocation of a second portion of total virtual currency balance associated with the user profile from the central server based on the first allocation scheme, wherein the second user device is associated with the user profile;
   storing, by the second user device, the second portion of the total virtual currency balance locally on a digital wallet of the second user device as a second balance;
   storing, by the second user device, the first application among a second set of applications on a memory of the second user device, wherein the first application is activated on the second user device using virtual currency balance locally stored on the second user device, wherein the first allocation scheme is determined based on a number of the first set of applications installed on the first user device and a number of the second set of applications installed on the second user device;
   depleting, by the first user device, the first portion of the total virtual currency balance using the first application;
   requesting, by the first user device, additional virtual currency from the second user device;
   receiving, by the first user device, the additional virtual currency from the second user device, wherein the additional virtual currency is subtracted from the second balance and added to the first balance;
   establishing communication with the central server at a time after receiving the additional virtual currency from the second user device;
   sending, by the first user device, a current value of the first balance to the central server;
   sending, by the first user device to the central server, a first message reporting a first amount of time that the first application was accessed by the user on the first user device;
   sending, by the second user device, a current value of the second balance to the central server;
   sending, by the second user device to the central server, a second message reporting a second amount of time that the first application was accessed by the user on the second user device;
   receiving, by the first user device, an allocation of a third portion of total virtual currency balance based on a second allocation scheme, wherein the second allocation scheme is determined based on the first amount of time and the second amount of time;
   storing, by the first user device, the third portion of the total virtual currency balance locally on the digital wallet of the first user device as an updated first balance, wherein the updated first balance is aligned with a usage frequency of the first application on the first user device;
   receiving, by the second user device, an allocation of a fourth portion of total virtual currency balance based on the second allocation scheme, wherein the central server changes the first allocation scheme into the second allocation scheme based on data received from the first user device and the second user device; and
   storing, by the second user device, the fourth portion of the total virtual currency balance locally on the digital wallet of the second user device as an updated second balance, wherein the updated second balance is aligned with a usage frequency of the first application on the second user device.

2. The method of claim 1, further comprising:
   receiving a message from the central server to acquire supplemental virtual currency when a sum of the current value of the first balance and the current value of the second balance is below a predetermined threshold.

3. The method of claim 1, further comprising:
   using, by the first user device, at least a portion of the first balance to acquire a service or an item provided by a server, wherein the first user device provides an interface for a user to access the server using the first user device.

4. The method of claim 1, wherein virtual currency is one of digital money, loyalty points, game points and game data.

5. A system comprising:
   a first user device comprising a first processor, a first memory coupled to the first processor and a first computer readable medium coupled to the first processor, and
   a second user device comprising a second processor, a second memory coupled to the second processor and a second computer readable medium coupled to the second processor,
   the first computer readable medium comprising code, executable by the first processor, to implement a method comprising:
      receiving an allocation of a first portion of total virtual currency balance associated with a user profile from a central server based on a first allocation scheme, wherein the first user device is associated with the user profile of a user;

storing the first portion of the total virtual currency balance locally on a digital wallet of the first user device as a first balance;

storing a first application among a first set of applications on a memory of the first user device, wherein the first application is activated on the first user device using virtual currency balance locally stored on the first user device;

depleting the first portion of the total virtual currency balance using the first application;

requesting additional virtual currency from the second user device; and receiving the additional virtual currency from the second user device;

establishing communication with the central server at a time after receiving the additional virtual currency from the second user device;

sending a current value of the first balance to the central server;

sending, to the central server, a first message reporting a first amount of time that the first application was accessed by the user on the first user device; and receiving an allocation of a third portion of total virtual currency balance based on a second allocation scheme;

storing the third portion of the total virtual currency balance locally on the digital wallet of the first user device as an updated first balance, wherein the updated first balance is aligned with a usage frequency of the first application on the first user device;

the second computer readable medium comprising code, executable by the second processor, to implement a method comprising:

receiving an allocation of a second portion of total virtual currency balance associated with the user profile from the central server based on the first allocation scheme, wherein the second user device is associated with the user profile;

storing the second portion of the total virtual currency balance locally on a digital wallet of the second user device as a second balance, wherein the additional virtual currency is subtracted from the second balance and added to the first balance;

storing the first application among a second set of applications on a memory of the second user device, wherein the first application is activated on the second user device using virtual currency balance locally stored on the second user device, wherein the first allocation scheme is determined based on a number of the first set of applications installed on the first user device and a number of the second set of applications installed on the second user device;

sending a current value of the second balance to the central server when the first portion of the total virtual currency balance is depleted by the first user device using the first application;

sending, to the central server, a second message reporting a second amount of time that the first application was accessed by the user on the second user device; and receiving an allocation of a fourth portion of total virtual currency balance based on the second allocation scheme, wherein the central server changes the first allocation scheme into the second allocation scheme based on data received from the first user device and the second user device, wherein the second allocation scheme is determined based on the first amount of time and the second amount of time; and storing the fourth portion of the total virtual currency balance locally on the digital wallet of the second user device as an updated second balance, wherein the updated second balance is aligned with a usage frequency of the first application on the second user device.

6. The system of claim 5, wherein the first computer readable medium further comprising code, executable by the first processor, to:
receive a message from the central server to acquire supplemental virtual currency when a sum of the current value of the first balance and the current value of the second balance is below a predetermined threshold.

7. The system of claim 5, wherein the first computer readable medium further comprising code, executable by the first processor, to:
use at least a portion of the first balance to acquire a service or an item provided by a server, wherein the first user device provides an interface for a user to access the server using the first user device.

8. The system of claim 5, wherein virtual currency is one of digital money, loyalty points, game points and game data.

* * * * *